(12) United States Patent
Kobayashi et al.

(10) Patent No.: US 9,030,639 B2
(45) Date of Patent: May 12, 2015

(54) LIQUID CRYSTAL DISPLAY DEVICE

(71) Applicant: Japan Display Inc., Tokyo (JP)

(72) Inventors: Masahiro Kobayashi, Tokyo (JP); Takeshi Sato, Tokyo (JP)

(73) Assignee: Japan Display Inc., Tokyo (JP)

( * ) Notice: Subject to any disclaimer, the term of this patent is extended or adjusted under 35 U.S.C. 154(b) by 43 days.

(21) Appl. No.: 14/040,985

(22) Filed: Sep. 30, 2013

(65) Prior Publication Data

US 2014/0098318 A1  Apr. 10, 2014

(30) Foreign Application Priority Data

Oct. 2, 2012  (JP) .................................. 2012-220115

(51) Int. Cl.
*G02F 1/1339*  (2006.01)
*G02F 1/1333*  (2006.01)

(52) U.S. Cl.
CPC ............ *G02F 1/1333* (2013.01); *G02F 1/1339* (2013.01)

(58) Field of Classification Search
CPC ............... G02F 1/1333; G02F 1/1339; G02F 1/133512; G02F 1/136209
USPC .................. 349/110, 111, 153, 190
See application file for complete search history.

(56) References Cited

U.S. PATENT DOCUMENTS

2003/0137630 A1 * 7/2003 Niiya .............................. 349/153
2007/0095468 A1 * 5/2007 Kim et al. ................... 156/275.3

FOREIGN PATENT DOCUMENTS

JP         10-123537 A    5/1998
JP         11-64862 A     3/1999

* cited by examiner

*Primary Examiner* — Dung Nguyen
*Assistant Examiner* — Tai Duong
(74) *Attorney, Agent, or Firm* — Lowe Hauptman & Ham, LLP

(57) ABSTRACT

Reduction in the reliability of a seal portion is prevented. The reduction is caused by a light shielding portion formed on the seal portion of a TFT substrate to hamper curing an ultraviolet curable sealing material. A sealing material has a two-layer structure of an ultraviolet curable sealing material that is an inner sealing material and a thermosetting and ultraviolet curable sealing material or a thermosetting sealing material that is an outer sealing material. A light shielding portion is formed on a TFT substrate under the outer sealing material, and is not formed on the TFT substrate under the inner sealing material. When ultraviolet rays are applied from the TFT substrate side, the inner sealing material is cured in a short time. The outer sealing material is then cured by heating. Thus, the overall seal portion can be sufficiently cured, and a highly reliable seal portion can be formed.

11 Claims, 6 Drawing Sheets

A — A

B—B

LIQUID CRYSTAL DISPLAY DEVICE

CLAIM OF PRIORITY

The present application claims priority from Japanese Patent Application JP 2012-220115 filed on Oct. 2, 2012, the content of which is hereby incorporated by reference into this application.

BACKGROUND OF THE INVENTION

1. Field of the Invention

The present invention relates to a display device, and to a liquid crystal display device that secures the reliability of sealing and prevents liquid crystals from being contaminated while the device is provided with a narrow picture frame.

2. Description of the Related Art

A liquid crystal display device is provided with a TFT substrate and a counter substrate. The TFT substrate has pixels including a pixel electrode, a thin film transistor (TFT), and the like in a matrix configuration. The counter substrate is disposed opposite to the TFT substrate, and has a color filter and the like formed at a location corresponding to the pixel electrode of the TFT substrate. Liquid crystals are sandwiched between the TFT substrate and the counter substrate. The transmittance of light caused by liquid crystal molecules is controlled at every pixel to form images.

Since the liquid crystal display device is flat and light weight, the use is growing in various fields. Small-sized liquid crystal display devices are widely used for a mobile telephone, a DSC (Digital Still Camera), etc. The small-sized liquid crystal display device is strongly demanded that the outer shape be reduced while securing a predetermined display region. This means that a distance between the end portion of the display region and the end portion of the outer shape, a so-called picture frame, is reduced. In this case, the area of an encapsulation portion that encapsulates liquid crystals becomes small to cause a problem of securing the reliability of a seal portion.

The liquid crystals are encapsulated with a sealing material. In the case where liquid crystals are filled by a one drop fill (ODF) process, liquid crystals are dropped before curing the sealing material. Such a problem arises in that before a sealing material is cured, materials in the sealing material spread in the liquid crystals, and the quality of the liquid crystals is degraded. The following configuration is described in Japanese Patent Application Laid-Open Publication No. Hei 10-123537. In order to prevent an uncured sealing material from spreading in liquid crystals, an elastic seal is used for an encapsulation material to encapsulate liquid crystals. This elastic seal only serves to confine liquid crystals, and is not responsible for bonding a TFT substrate to a counter substrate. A thermosetting sealing material or an ultraviolet (UV) curable sealing material is formed on the outer side of the elastic seal to bond a TFT substrate to a counter substrate.

Moreover, a configuration is described in paragraph "0005" and FIG. 11 in Japanese Patent Application Laid-Open Publication No. Hei 10-123537 in which a UV curable seal is formed on the inner side of the elastic seal and a thermosetting seal is formed on the outer side. However, a gap is provided between the seal on the inner side and the seal on the outer side. Furthermore, no description is provided on the relationship between the UV curable seal and a light shielding portion formed on the TFT substrate.

A configuration is described in Japanese Patent Application Laid-Open Publication No. Hei 11-64862 in which a thermosetting bonding layer is formed as a sealing material on the inner side and a bonding layer made of a two-liquid adhesive resin or an ultraviolet curing resin is formed on the outer side of the thermosetting bonding layer. An object of Japanese Patent Application Laid-Open Publication No. Hei 11-64862 is to prevent a phenomenon in bonding a TFT substrate to a counter substrate using a thermosetting resin in which thermal strain deforms the substrates and a gap between the TFT substrate and the counter substrate is changed.

SUMMARY OF THE INVENTION

In the case where liquid crystals are filled by the one drop fill process, a UV curable sealing material is used whose curing rate is fast for the sealing material. However, in the liquid crystal display panel, a so-called narrow picture frame panel is demanded in which a distance between the end portion of the display region and the end portion of the liquid crystal display panel is small. Since a black matrix is formed on the counter substrate side, ultraviolet rays are applied from the TFT substrate side.

However, in the narrow picture frame panel, the light shielding portion such as interconnections and circuits occupied on the lower side of the sealing material occupies a large area. This means that problems arise in that the ultraviolet curing resin on the light shielding portion is not cured sufficiently, and the seal is peeled off in a high temperature and high humidity test or the like. Moreover, when the sealing material is not sufficiently cured, external force increases an amount of the liquid crystal display panel deformed, and so-called sliding resistance is degraded.

FIGS. 10 and 11 are a plan view and a cross sectional view of the problems described above. FIG. 10 is a liquid crystal display panel for use in a mobile telephone or the like. The liquid crystal display panel has a so-called narrow picture frame, in which a distance d from the end portion of a display region 10 to the end portion of a counter substrate 200 is 1.2 mm, for example. In FIG. 10, the counter substrate 200 is bonded on a TFT substrate 100 with an ultraviolet curable sealing material 30. The TFT substrate 100 is formed larger than the counter substrate 200, and a portion of a single TFT substrate 100 is a terminal portion 150. The terminal portion 150 is mounted with an IC driver, not illustrated, and a flexible circuit board, not illustrated, is connected to the IC driver.

In FIG. 10, on the lower side of the ultraviolet curable sealing material 30, that is, on the TFT substrate 100, a light shielding portion 101 exists such as interconnections or a scanning line drive circuit. Since ultraviolet rays to cure the ultraviolet curable sealing material 30 are applied from the TFT substrate 100 side, the ultraviolet curable sealing material 30 under the light shielding portion 101 is not sufficiently cured when this light shielding portion 101 exists.

FIG. 11 is a cross sectional view along a line B-B in FIG. 10. In FIG. 11, the TFT substrate 100 is bonded to the counter substrate 200 through the ultraviolet curable sealing material 30. The light shielding portion 101 such as interconnections is formed on the TFT substrate 100 under the ultraviolet curable sealing material 30, and an insulating layer 102 is formed on the light shielding portion 101. It is noted that TFTs, a passivation film, pixel electrodes, and so on are formed on the TFT substrate 100, and these layers are omitted in FIG. 11. Liquid crystals 300 are sandwiched between the TFT substrate 100 and the counter substrate 200.

In FIG. 11, the ultraviolet curable sealing material 30 is cured by applying ultraviolet rays from the TFT substrate 100 side. Since ultraviolet rays are not applied to the portion right above the light shielding portion 101, an uncured region 31 of the ultraviolet curable sealing material 30 is produced. This means that it is likely that the sealing material 30 is peeled off from this portion because adhesive strength in the portion is weak.

On the other hand, there is a method in which a thermosetting sealing material or a thermosetting and ultraviolet curable sealing material is used instead of the ultraviolet curable sealing material. However, the thermosetting sealing material has a slow curing rate, and it is likely that an uncured sealing material spreads in liquid crystals. Moreover, the thermosetting and ultraviolet curable sealing material includes an ultraviolet radical and a thermal radical, and it is likely to contaminate liquid crystals because the amount of the radicals becomes large.

It is an object of the present invention to implement a liquid crystal display device that secures the adhesive strength of a sealing material, prevents impurities such as moisture from externally entering through the sealing material, and does not contaminate liquid crystals with the sealing material or ultraviolet radicals and thermal radicals, in a liquid crystal display device using a liquid crystal filling method by the ODF process.

The present invention is to overcome the above problems. The specific aspects are as follows.

(1) A liquid crystal display device includes a TFT substrate and a counter substrate having a display region. The TFT substrate is bonded to the counter substrate through a sealing material. Liquid crystals are sandwiched inside between the TFT substrate and the counter substrate. The liquid crystals are filled by a one drop fill process. The sealing material includes an inner sealing material formed of an ultraviolet curable sealing material and an outer sealing material formed of a thermosetting and ultraviolet curable sealing material or a thermosetting sealing material, and the inner sealing material closely contacting the outer sealing material. A ratio of a light shielding portion formed on the TFT substrate on a portion on which the inner sealing material contacts the TFT substrate is smaller than a ratio of a light shielding portion formed on the TFT substrate on a portion on which the outer sealing material contacts the TFT substrate.

(2) A liquid crystal display device includes a TFT substrate and a counter substrate having a display region. The TFT substrate is bonded to the counter substrate through a sealing material. Liquid crystals are sandwiched inside between the TFT substrate and the counter substrate. The liquid crystals are filled by a one drop fill process. The sealing material includes a first sealing material formed of a thermosetting and ultraviolet curable sealing material or a thermosetting sealing material as well as a second sealing material formed of an ultraviolet curable sealing material covering the first sealing material. A ratio of a light shielding portion formed on the TFT substrate on a portion on which the second sealing material contacts the TFT substrate is smaller than a ratio of a light shielding portion formed on the TFT substrate on a portion on which the first sealing material contacts the TFT substrate.

According to the present invention, the bonding strength between the TFT substrate or the counter substrate and the sealing material is improved, so that the deformation of a liquid crystal display panel caused by external force can be prevented, and so-called sliding resistance can be improved.

Moreover, according to the present invention, the adhesion between the sealing material and the substrates are improved, so that impurities such as moisture can be prevented from externally entering through the seal portion.

Furthermore, according to the present invention, the sealing material on the portion on which the sealing material contacts liquid crystals is cured quickly because the ultraviolet curable sealing material is used. Therefore, liquid crystals can be prevented from being contaminated caused by the sealing material or radicals to spread in the liquid crystals.

DETAILED DESCRIPTION OF THE PREFERRED EMBODIMENTS

In the following, the present invention will be described in detail with reference to embodiments.

First Embodiment

Figure 1:
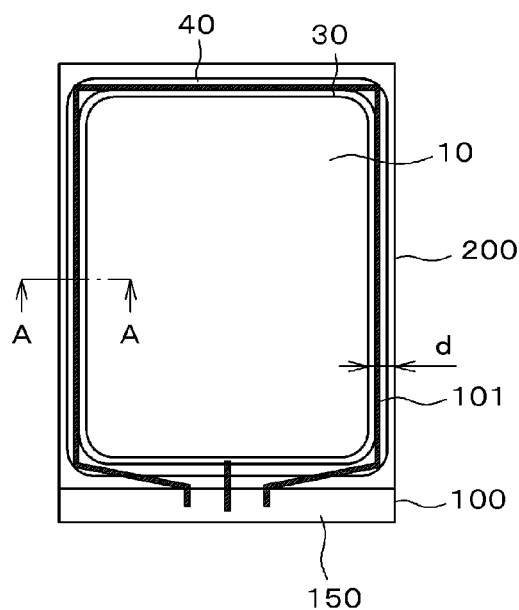
FIG. 1 is a plan view of a liquid crystal display device according to a first embodiment of the present invention.

FIG. 1 is a plan view of a liquid crystal display device according to the present invention. FIG. 1 is a liquid crystal display panel in a configuration similar to the configuration of the liquid crystal display panel described in FIG. 10 except a seal portion, and the description of the configuration is omitted. The liquid crystal display panel has a so-called narrow picture frame, in which a distance d from the end portion of a display region to the end portion of a counter substrate is 1.2 mm, for example. As described above, the present invention is particularly effective in a liquid crystal display panel in a narrow picture frame in which a width d of the picture frame is 1.2 mm or less. In other words, the present invention eliminates problems of a narrow picture frame in that a narrow picture frame is provided to increase the ratio of the area on which a light shielding portion such as interconnections is formed on the lower side of a sealing material, and the possibility is increased that an uncured portion is produced in the case where an ultraviolet curable sealing material is used.

Figure 10:
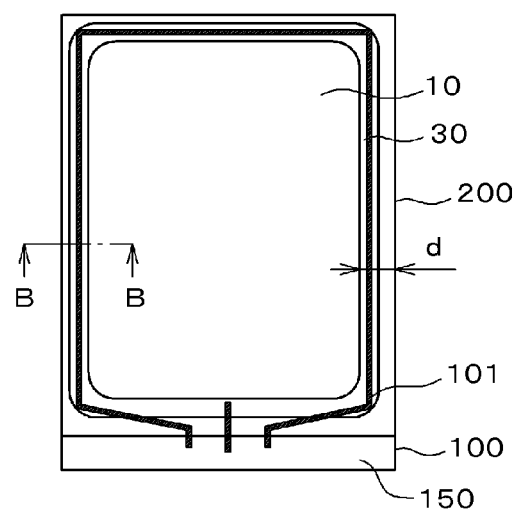
FIG. 10 is a plan view of a liquid crystal display device according to a conventional example.

The seal portion is different between the configuration in FIG. 1 and the configuration of a conventional example in FIG. 10. In FIG. 1, a sealing material is formed of two layers, an inner sealing material 30 and an outer sealing material 40. The inner sealing material 30 is formed on the inner side of a light shielding portion 101 such as interconnections. The inner sealing material 30 is formed of an ultraviolet curable sealing material 30.

The outer sealing material 40 is formed as closely contacting the inner sealing material 30. The outer sealing material 40 is formed of a thermosetting and ultraviolet curable sealing material 40 or a thermosetting sealing material 40. The inner sealing material 30 and the outer sealing material 40 are formed as closely contacting each other, so that the overall width of the seal portion can be maintained small, and a narrow picture frame can be provided.

Figure 2:
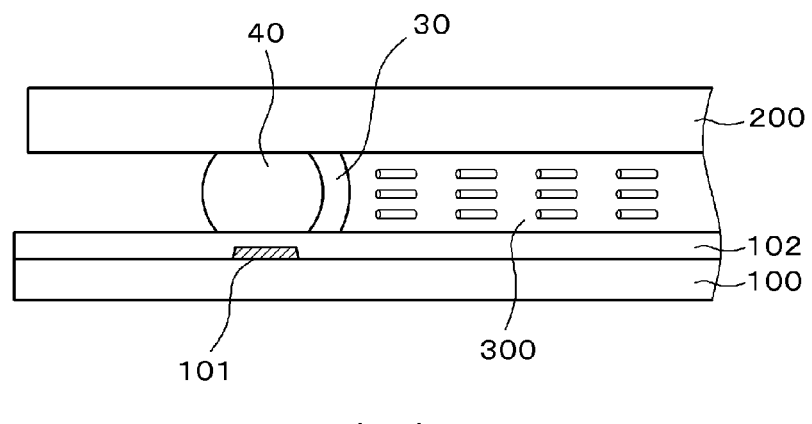
FIG. 2 is a cross sectional view along a line A-A in FIG. 1.
Figure 11:
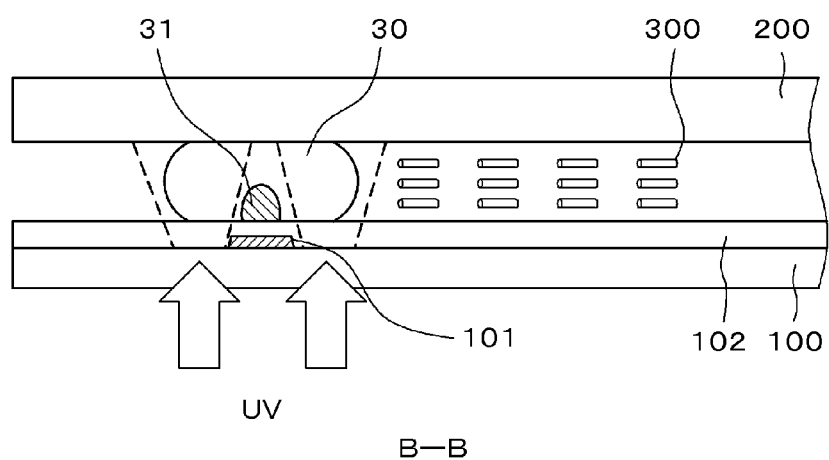
FIG. 11 is a cross sectional view along a line B-B in FIG. 10.

FIG. 2 is a cross sectional view along a line A-A in FIG. 1. The configuration in FIG. 2 is similar to the configuration described in FIG. 11 except the seal portion, and the description is omitted. In FIG. 2, the seal portion is formed of the inner sealing material 30 made of the ultraviolet curable sealing material 30 and the outer sealing material 40 made of the thermosetting and ultraviolet curable sealing material 40 or the thermosetting sealing material 40.

In FIG. 2, the light shielding portion 101 such as interconnections is formed on a TFT substrate 100 on the lower side of the thermosetting sealing material 40 or the thermosetting and ultraviolet curable sealing material 40 forming the outer sealing material 40. However, the light shielding portion 101 is not formed on the TFT substrate 100 on the lower side of the ultraviolet curable sealing material 30 forming the inner sealing material 30. In the configuration of the sealing material as described above, when ultraviolet rays are applied from the lower side of the TFT substrate 100, the ultraviolet curable sealing material 30 having no light shielding portion 101 below is cured first. Thus, it can be prevented that liquid crystals are contaminated caused by the sealing material or radicals.

After the application, the thermosetting and ultraviolet curable sealing material 40 or the thermosetting sealing material 40 that is the outer sealing material 40 is cured by applying heat to strongly seal the TFT substrate 100 and the counter substrate 200. The light shielding portion 101 is formed on the TFT substrate 100 on the lower side of the thermosetting and ultraviolet curable sealing material 40 or the thermosetting sealing material 40 that is the outer sealing material 40. The thermosetting and ultraviolet curable sealing material 40 or the thermosetting sealing material 40 is cured by heating, so that the sealing material can be completely cured as a whole, and the reliability of the seal portion can be secured.

Figure 3:
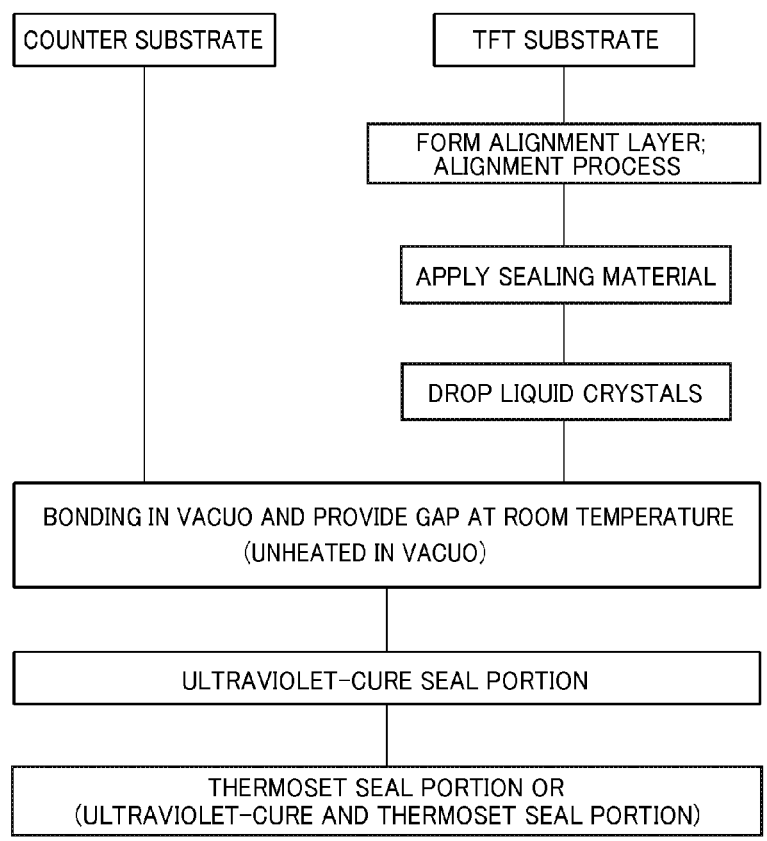
FIG. 3 is a manufacture flow of the liquid crystal display device according to the present invention.

FIG. 3 is a manufacture flow of the liquid crystal display device according to the present invention. In FIG. 3, an alignment layer is formed on the TFT substrate, which is formed with pixel electrodes and so on, for an alignment process. After the alignment process, the sealing material according to the present invention is applied, and liquid crystals are filled in the region surrounded by the sealing material using by the one drop fill process. After the filling, the counter substrate separately formed is bonded to the TFT substrate in vacuo through the sealing material, and a gap is provided between the TFT substrate and the counter substrate at room temperature.

After providing the gap, ultraviolet rays are applied from the TFT substrate side, and the ultraviolet curable sealing material that is the inner sealing material is mainly cured. After the curing, the liquid crystal display panel is heated to cure the thermosetting and ultraviolet curable sealing material or the thermosetting sealing material. Thus, both of the inner sealing material and the outer sealing material can be completely cured, and a highly reliable seal portion can be formed.

Figure 4:
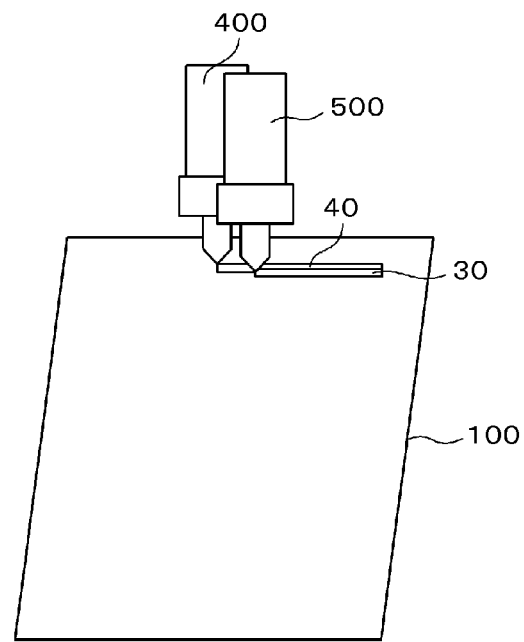
FIG. 4 is a schematic diagram of a method for drawing a sealing material according to the first embodiment.

FIG. 4 is a schematic diagram of the application of the sealing materials using dispensers to form the seal portion according to the present invention. In FIG. 4, the thermosetting and ultraviolet curable sealing material 40 or the thermosetting sealing material 40 is applied using a first dispenser 400, and the ultraviolet curable sealing material 30 is applied using a second dispenser 500. Namely, the first dispenser 400 and the second dispenser 500 are used in a pair.

First, the first dispenser 400 is used to draw the thermosetting and ultraviolet curable sealing material 40 or the thermosetting sealing material 40 that is the outer sealing material 40. After the drawing, the second dispenser 500 is used to draw the ultraviolet curable sealing material 30 that is the inner sealing material 30 slightly on the inner side of the outer sealing material 40 first drawn as contacting the outer sealing material 40.

In the drawing, the viscosity of the ultraviolet curable sealing material 30 that is the inner sealing material 30 is made lower than the viscosity of the thermosetting and ultraviolet curable sealing material 40 or the thermosetting sealing material 40 that is the outer sealing material 40, which is first drawn, so that the inner side of the outer sealing material 40 can be easily covered with the inner sealing material 30. Therefore, the adhesion between the inner sealing material 30 and the outer sealing material 40 is improved.

Figure 5:
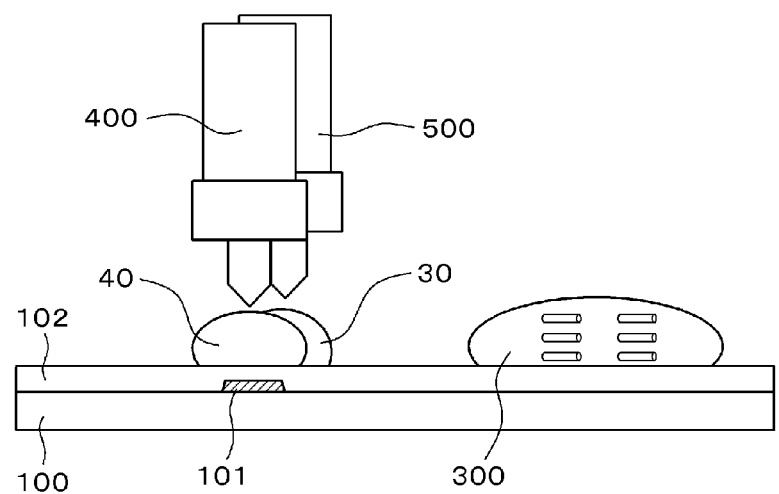
FIG. 5 is a cross sectional view of a state in which liquid crystals are dropped in the first embodiment.
Figure 6:
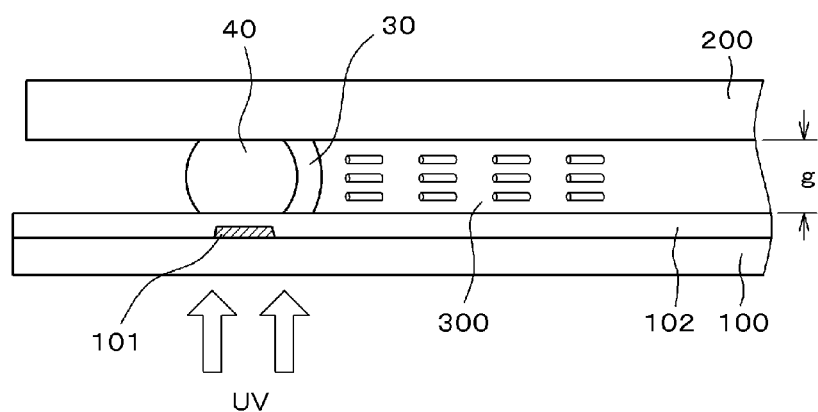
FIG. 6 is a cross sectional view of a state in which a counter substrate is bonded to a TFT substrate, a gap is defined, and ultraviolet rays are applied to a seal portion.

FIG. 5 is a state in which liquid crystals 300 are dropped in the region surrounded by the sealing materials formed as in FIG. 4 by the one drop fill process. FIG. 6 is a cross sectional view of a state in which the counter substrate 200 is laid on the TFT substrate 100 on which the liquid crystals 300 are dropped, the counter substrate 200 is bonded to the TFT substrate 100 through the sealing materials 30 and 40, and a gap g is formed between the TFT substrate 100 and the counter substrate 200. This process is performed in vacuo or in a reduced pressure atmosphere. In the bonding, the TFT substrate 100 and the counter substrate 200 are controlled to have a predetermined gap g between the substrates.

After providing the gap, as illustrated in FIG. 6, ultraviolet rays are applied to the seal portion from the TFT substrate 100 side. First, the ultraviolet curable sealing material 30 that is the inner sealing material 30 is cured, and then the thermosetting and ultraviolet curable sealing material 40 or the thermosetting sealing material 40 that is the outer sealing material 40 is cured by heating for the completion of the seal.

In the description above, for simplifying the description, as illustrated in FIG. 2 and the other drawings, the light shielding portion 101 does not exist on the TFT substrate 100 under the lower side of the ultraviolet curable sealing material 30 that is the inner sealing material 30. However, in the actual panels, interconnections and the like are continuously formed, and it is unlikely that the light shielding portion 101 does not exist at all under the ultraviolet curable sealing material 30. Even though the light shielding portion 101 exists, it is likely that there is some light shielding portion that does not prevent the sealing material from being cured by ultraviolet rays in the case where ultraviolet rays are applied.

On the other hand, on the lower side of the thermosetting and ultraviolet curable sealing material 40 or the thermosetting sealing material 40 that is the outer sealing material 40, the light shielding portion 101 exists in a relatively wide area. In the case where ultraviolet rays are applied from the lower side of the TFT substrate 100, the ultraviolet curable sealing material 30 is not cured on the portion right above the light shielding portion 101 because of the light shielding portion 101. Thus, the thermosetting and ultraviolet curable sealing material 40 or the thermosetting sealing material 40 is disposed on the portion, and cured by heating.

In other words, it is necessary that the ratio of the light shielding portion 101 on the portion on which the ultraviolet curable sealing material 30 that is the inner sealing material 30 contacts the TFT substrate 100 be smaller than the ratio of the light shielding portion 101 on the portion on which the portion corresponding to the thermosetting and ultraviolet curable sealing material 40 or the thermosetting sealing material 40 that is the outer sealing material 40 contacts the TFT substrate 100. Alternatively, it is necessary that the width of the light shielding portion 101 on the portion on which the ultraviolet curable sealing material 30 that is the inner sealing material 30 contacts the TFT substrate 100 be smaller than the width of the light shielding portion 101 on the portion on which the thermosetting and ultraviolet curable sealing material 40 or the thermosetting sealing material 40 that is the outer sealing material 40 contacts the TFT substrate 100.

Moreover, in the discussions above, the description is made in which the sealing material is formed on the TFT substrate 100 side. However, the sealing material according to the embodiment may be formed on the counter substrate 100 side when the positions of the inner sealing material 30 and the outer sealing material 40 can be accurately controlled.

According to the embodiment, the overall seal portion can be completely cured, so that the reliability of the seal portion can be improved. Moreover, the ultraviolet curable sealing material that is the inner sealing material to contact liquid crystals is cured first by applying ultraviolet rays, so that the possibility can be prevented that the sealing material or radicals spread in liquid crystals to contaminate the liquid crystals.

Second Embodiment

Figure 7:
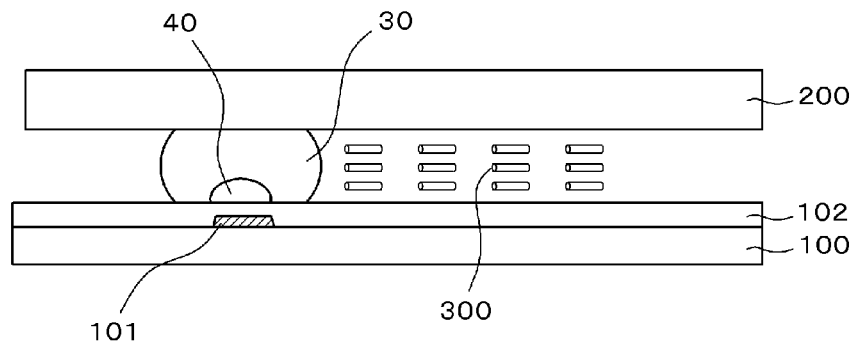
FIG. 7 is a cross sectional view of a structure according to a second embodiment.

FIG. 7 is a cross sectional view of a second embodiment of the present invention. FIG. 7 is a cross sectional view corresponding to the cross section along the line A-A in FIG. 1. The configuration in FIG. 7 is similar to the configuration in FIG. 11 or the configuration in FIG. 2 of the first embodiment except a seal portion. The embodiment illustrated in FIG. 7 is different from the first embodiment illustrated in FIG. 2 and other drawings in the shape of the seal portion. In FIG. 7, a first sealing material 40 formed of a thermosetting and ultraviolet curable sealing material 40 or a thermosetting sealing material 40 is formed right above a light shielding portion 101 formed on a TFT substrate 100. A second sealing material 30 formed of an ultraviolet curable sealing material 30 is formed to cover the first sealing material 40.

Also in the embodiment, ultraviolet rays to cure the ultraviolet curable sealing material 30 is applied from the lower side of the TFT substrate 100. In FIG. 7, in the case where ultraviolet rays are applied from the lower side of the TFT substrate 100, ultraviolet rays are not applied to the portion right above the light shielding portion 101. Therefore, the thermosetting and ultraviolet curable sealing material 40 or the thermosetting sealing material 40 that is the first sealing material 40 is formed on the portion, and cured by heating. On the other hand, when the ultraviolet curable sealing material 30 is provided at a location near a counter substrate 200 apart from the light shielding portion 101, which is although located above the light shielding portion 101, ultraviolet rays are diffracted by diffraction, refraction, or the like to cure the ultraviolet curable sealing material 30 that is the second sealing material 30.

In FIG. 7, the light shielding portion 101 does not exist on the lower side of the ultraviolet curable sealing material 30 that is the second sealing material 30 formed so as to surround the first sealing material 40. However, as also described in the first embodiment, interconnections and the like are continued, and the light shielding portion 101 exists to some extent even on the lower side of the second sealing material 30. However, the ratio of the light shielding portion 101 on the portion on which the second sealing material 30 contacts the TFT substrate 100 is smaller than the ratio of the light shielding portion 101 on the portion on which the first sealing material 40 contacts the TFT substrate 100. Alternatively, the width of the light shielding portion 101 on the portion on which the second sealing material 30 contacts the TFT substrate 100 can be made smaller than the width of the light shielding portion 101 on the portion on which the first sealing material 40 contacts the TFT substrate 100.

Figure 8:
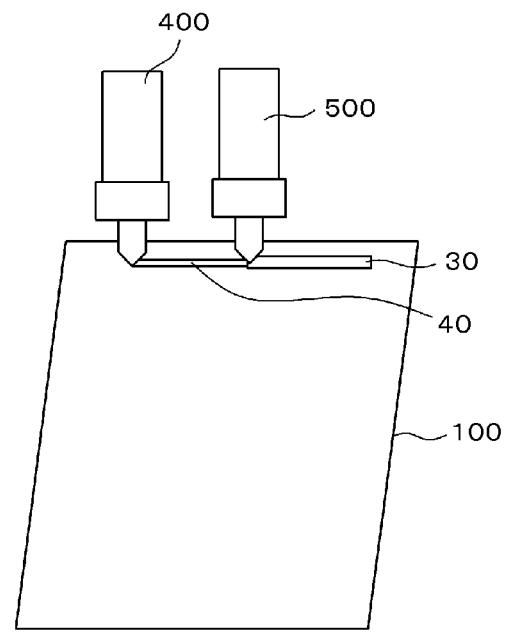
FIG. 8 is a schematic diagram of a method for drawing a sealing material according to the second embodiment.

FIG. 8 is a perspective view in the case where the seal portion in the embodiment is formed using dispensers. A first dispenser 400 is used to draw the thermosetting and ultraviolet curable sealing material 40 or the thermosetting sealing material 40 that is the first sealing material 40, and the ultraviolet curable sealing material 30 that is the second sealing material 30 is drawn so as to cover the first sealing material 40. Also in this case, preferably, the viscosity of the second sealing material 30 is smaller than the viscosity of the first sealing material 40. This is because the adhesion between the first sealing material 40 and the second sealing material 30 is further improved.

Figure 9:
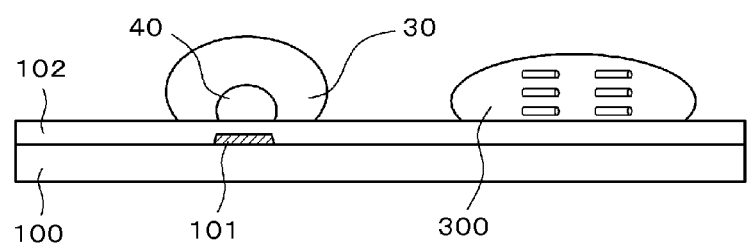
FIG. 9 is a cross sectional view of a state in which liquid crystals are dropped in the second embodiment.

FIG. 9 is a state in which the sealing material is formed entirely around the TFT substrate 100 and then the liquid crystals 300 are filled on the inner side of the sealing material by the one drop fill process. After the filling, the counter substrate 200 is bonded in vacuo through the sealing material according to the embodiment, and a gap between the TFT substrate 100 and the counter substrate 200 is adjusted. After the adjusting, first, ultraviolet rays are applied to cure the ultraviolet curable sealing material 30 that is the second sealing material 30, the thermosetting and ultraviolet curable sealing material 40 or the thermosetting sealing material 40 that is the first sealing material 40 is cured by heating, and then curing the seal portion is completed.

According to the embodiment, the overall seal portion can be completely cured, so that the reliability of the seal portion can be improved. Moreover, the ultraviolet curable sealing material that is the second sealing material to contact liquid crystals is cured first, so that the possibility can be prevented that the sealing material or radicals spread in liquid crystals to contaminate the liquid crystals.

What is claimed is:

1. A liquid crystal display device comprising:
    a TFT substrate and a counter substrate, the TFT substrate being bonded to the counter substrate through a sealing material, liquid crystals being sandwiched inside between the TFT substrate and the counter substrate,
    wherein the sealing material is formed in a closed ring shape and includes an inner sealing material formed of an ultraviolet curable sealing material and an outer sealing material formed of a thermosetting and ultraviolet curable sealing material or a thermosetting sealing material, the inner sealing material closely contacting the outer sealing material, at least a part of the inner sealing material disposed at an inner side of the outer sealing material; and
    a ratio of a first light shielding portion formed on the TFT substrate on a portion on which the inner sealing material contacts the TFT substrate is smaller than a ratio of a second light shielding portion formed on the TFT substrate on a second portion on which the outer sealing material contacts the TFT substrate.

2. The liquid crystal display device according to claim 1, wherein a width of the first light shielding portion is smaller than a width of the second light shielding portion.

3. The liquid crystal display device according to claim 1, wherein the liquid crystals are filled by a one drop fill process.

4. The liquid crystal display device according to claim 1, wherein the inner sealing material covers a whole of the outer sealing material.

5. The liquid crystal display device according to claim 1, wherein the first light shielding portion and the second light shielding portion consist of interconnections or a scanning line drive circuit.

6. The liquid crystal display device according to claim 1, wherein a width from an end portion of a display region to an end portion of the counter substrate is 1.2 mm or less.

7. A liquid crystal display device comprising:

a TFT substrate and a counter substrate, the TFT substrate being bonded to the counter substrate through a sealing material, liquid crystals being sandwiched inside between the TFT substrate and the counter substrate, wherein the sealing material is formed in a closed ring shape and includes a first sealing material formed of a thermosetting and ultraviolet curable sealing material or a thermosetting sealing material as well as a second sealing material formed of an ultraviolet curable sealing material covering the first sealing material; and a ratio of a first light shielding portion formed on the TFT substrate on a portion on which the second sealing material contacts the TFT substrate is smaller than a ratio of a second light shielding portion formed on the TFT substrate on a portion on which the first sealing material contacts the TFT substrate.

8. The liquid crystal display device according to claim 7, wherein a width of the first light shielding portion is smaller than a width of the second light shielding portion.

9. The liquid crystal display device according to claim 7, wherein the liquid crystals are filled by a one drop fill process.

10. The liquid crystal display device according to claim 7, wherein the first light shielding portion and the second light shielding portion consist of interconnections or a scanning line drive circuit.

11. The liquid crystal display device according to claim 7, wherein a width from an end portion of a display region to an end portion of the counter substrate is 1.2 mm or less.

* * * * *